(12) United States Patent
Saito et al.

(10) Patent No.: US 6,560,043 B1
(45) Date of Patent: May 6, 2003

(54) IMAGE PICKUP LENS SYSTEM (75) Inventors: Tomohiro Saito, Kawaguchi (JP); Isamu Kaneko, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 09/658,226

(22) Filed: Sep. 8, 2000

(30) Foreign Application Priority Data

Sep. 9, 1999 (JP) .............................. 11-255581

(51) Int. Cl.[7] ................................ G02B 9/14
(52) U.S. Cl. ...................... 359/785; 359/740
(58) Field of Search ................. 359/784–785, 359/754–758, 763–764, 766, 771–774, 738–740

(56) References Cited

U.S. PATENT DOCUMENTS 5,861,999 A * 1/1999 Tada ........................ 359/752
5,973,850 A * 10/1999 Nagaoka .................... 359/654
6,057,971 A * 5/2000 Mihara ...................... 359/793

* cited by examiner

Primary Examiner—Jordan M. Schwartz
(74) Attorney, Agent, or Firm—Koda & Androlia (57) ABSTRACT

An image pickup lens system comprises a first lens which has a concave face formed on the side of an object in the vicinity of an optical axis, and which has a positive power, a diaphragm, a second lens having a negative power, and a third lens having a positive power. The first lens, the diaphragm and the second and third lenses are disposed sequentially from the side of the objects. If the image pickup lens system is formed in the above manner, a desired optical performance can be maintained, and a sufficient back focal length can be ensured, while a high telecentric property can be ensured. Moreover, various aberrations can be corrected satisfactorily, and the image pickup lens system can be produced easily.

4 Claims, 11 Drawing Sheets

IMAGE PICKUP LENS SYSTEM

BACKGROUND OF THE INVENTION

1. Field of the Invention

The present invention relates to an image pickup lens system and particularly, to an image pickup lens system which is comprised of three lenses and used in an image pick-up device (e.g., an image-inputting CCD camera) utilizing a solid image-pickup element such as CCD, CMOS and the like mounted on a potable computer, a visual telephone and the like, and which can be reduced in size and weight.

2. Description of the Related Art

In recent years, multimedia have been developed remarkably, and for example, the demand for a camera utilizing an image pickup element such as CCD, CMOS and like, e.g., a CCD camera, mounted on a portable computer, a visual telephone and the like, is being increased remarkably. Such a CCD camera is required to be mounted in a limited space and for this reason, it is desired that the CCD camera is small in size and lightweight. Therefore, it is also desired that an image pickup lens system used in such a CCD camera is likewise small in size and lightweight.

A one-lens system using a single lens or a two-lens system using two lenses is conventionally used as such an image pickup lens system.

However, such a lens system is convenient extremely for reducing the size and weight of the lens, but recently suffers from a problem that it is not suitable for increasing the picture quality and the resolution required for the image pick-up lens system.

For this reason, it is a conventional practice to use a three-lens system using three lenses, thereby providing increases in picture quality and in resolution.

Such a three-lens system has a long history in the field of a silver-salt photograph camera, and optical lens systems of various arrangements have been developed.

In the lens system in the silver-salt photograph camera, however, the diameter of a lens is larger and moreover, the focal length is larger. Therefore, even if the lens is utilized in a shape as it is and in a reduced size as an image pickup lens for an image pickup element, many disadvantages are encountered, for example, the thickness of the center and the flange portion of the lens is extremely small; an exit pupil is too close to an image surface; and a back focal length is reduced. In this way, such lens cannot be utilized as it is.

Therefore, a three-lens image pickup lens system exclusively used in an image pickup element has been conventionally developed. One example of such image pickup lens system is a lens system comprising a lens having a first convex-shaped face adjacent an object and having a negative power, a lens having a negative power and a lens having a positive power, which are arranged sequentially from the side of the object.

However, such conventional image pickup lens system, because of the first face of the first lens formed into a convex face, suffers from the following problems: A large back focal length cannot be ensured, and various aberrations including mainly a chromatic aberration cannot be corrected appropriately. Further, it is difficult to ensure a large distance from an exit pupil to an image surface, and it is impossible to ensure a telecentric property.

SUMMARY OF THE INVENTION

Accordingly, it is an object of the present invention to provide an image pickup lens system in which a large back focal length can be ensured, while ensuring a large angle widening and maintaining a desired optical performance, and a high telecentric property can be ensured and moreover, various aberrations can be corrected satisfactorily, and which can be produced easily.

To achieve the above object, according to the present invention, there is provided an image pickup lens system comprising a first lens which has a concave face formed on the side of an object in the vicinity of an optical axis, and which has a positive power, a diaphragm, a second lens having a negative power, and a third lens having a positive power, said first lens, said diaphragm, said second lens and said third lens being arranged sequentially from the side of the object.

With the above feature, the first lens has the concave face formed on the side of the object in the vicinity of the optical axis, and has the positive power. Therefore, a sufficient back focal length can be ensured, while maintaining a desired optical performance and ensuring a large angle-widening, and a distance from an image surface to an exit pupil can be ensured to ensure a high telecentric property. Moreover, the entire optical system can be reduced in size and can be produced easily. An unnecessary light beam of an off-axial flux causing a flaring and the like can be corrected or removed effectively by disposing the diaphragm between the first and second lenses, as compared with a case where the diaphragm is disposed at a location closer to an object from a first lens.

According to the present invention, the radius $|r_1|$ of curvature of the first face on the side of the first lens at its center is equal to or smaller than a focal length f1 of the entire optical system.

With such feature, the satisfaction of the above condition ensures that a large back focal length can be ensured, and a further increase in angle of view and a reduction in focal length can be realized, while providing a reduction in size of the entire optical system.

According to the present invention, the diaphragm is disposed at a location closer to the first lens from an intermediate point between the first and second lenses.

With above feature, the diaphragm is disposed at the above-described location and hence, an increase in size of each lens, particularly, the third lens can be prevented, while ensuring a sufficient distance from an image pickup surface to an exit pupil.

According to the present invention, the first face of at least the second lens is formed into an aspherical shape.

With the above feature, various aberrations can be corrected affectively, because the first face of at least the second lens is formed into the aspherical shape.

According to the present invention, the second lens is a lens formed into a concave face on the side of the object in the vicinity of an optical axis and having a negative power.

With the above feature, the face (first face) of the second lens on the side of the object is the concave face and hence, various aberrations including mainly an axial chromic aberration can be corrected satisfactorily, and an exit pupil can be positioned at a point far away from an image surface, while shortening the entire length of the optical system, thereby ensuring a high telecentric property. Further, the second lens can be formed at a high eccentricity resistance and produced easily.

According to the present invention, the second lens is a lens, which has a convex face formed on the side of the object in the vicinity of an optical axis and which has a negative power.

With the above feature, the face (first face) of the second lens is the convex face and hence, a further reduction in size of the entire optical system can be provided, while ensuring a high telecentric property to a certain extent, as compared with a case where such a face is a concave face.

The above and other objects, features and advantages of the invention will become apparent from the following description of the preferred embodiment taken in conjunction with the accompanying drawings.

DESCRIPTION OF THE PREFERRED EMBODIMENTS

The present invention will now be described by way of an embodiment with reference.to the accompanying drawings, i.e., FIGS. 1 to 11.

Figure 1:
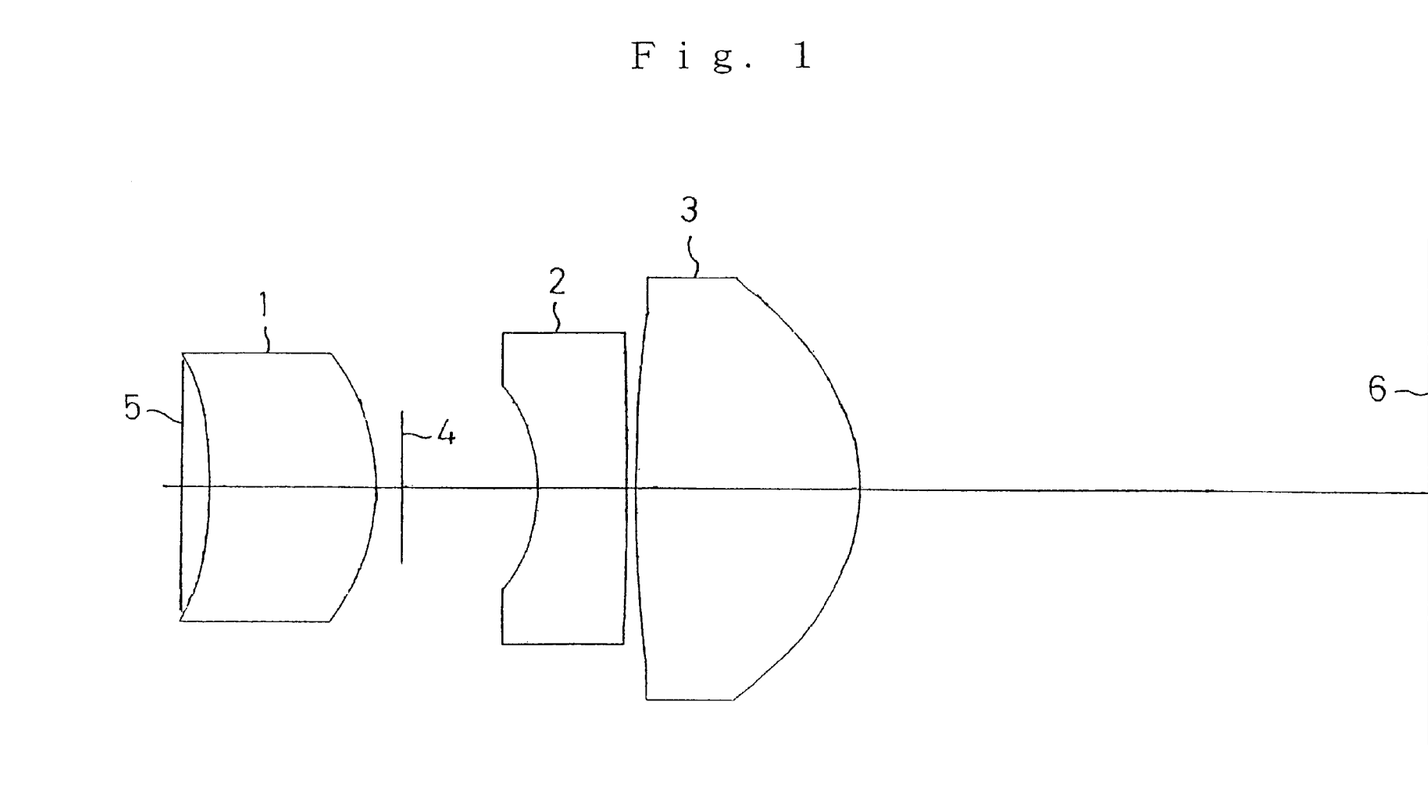
FIG. 1 is a schematic illustration of an arrangement of an embodiment of an image pickup lens system according to the present invention.

FIG. 1 shows a basic structure of an image pickup lens system according to the present invention. The image pickup lens system of this embodiment comprises a first lens 1 which has a concave face formed on the side of an object in the vicinity of an optical axis, and which has a positive power, a second lens 2 having a negative power, a third lens having a positive power. The first, second and third lenses are disposed sequentially from the side of the object. Among the first, second and third lenses, the first face of at least the first lens located adjacent the object is formed into an aspherical shape.

A diaphragm 4 is disposed between the first and second lenses 1 and 2. In the present embodiment, the diaphragm 4 is disposed at a location closer to the object from a central point between the first and second lenses 1 and 2.

A light-amount limiting plate 5 is disposed at a location adjacent the first face of the first lens, and CCD as an image pickup element is mounted at a location adjacent a second face of the third lens 3. Reference character 6 designates an image pickup surface of the CCD.

For the purpose of protecting the image pickup surface of the CCD or for another purpose, a cover glass, which is not shown in FIG. 1, may be disposed if desired between the second face of the third lens 3 and the image pickup surface 6 of the CCD. A low-pass filter may be disposed in place of the cover glass or in addition to the cover glass.

In general, it is desirable that the back focal length in an optical system for a solid image pickup element satisfies the following condition:

$$0.5\,f1 > Bf > 1.2f1, \text{ preferably, } f1 > Bf \tag{1}$$

wherein f1 is a focal length of the entire optical system, and Bf is a back focal length.

If the back focal length Bf in the expression (1) is smaller than 0.5 F1, any of various filters or the like cannot be inserted. If the back focal length Bf is larger than 1.2 f1, the size of the entire optical system is increased.

In the present embodiment, the first lens 1 has the concave face formed on the side of the object in the vicinity of an optical axis and has the positive power. Thus, it is possible to ensure a large back focal length so as to satisfy the expression (1).

The first lens 1 further satisfies the following condition:

$$|r_1| > f1 \tag{2}$$

wherein $r_1$ is a radius of curvature of the first face (on the side of the object) of the first lens 1 at the center thereof, and F1 is a focal length of the entire optical system.

In the present embodiment, the above expression (2) is a condition ensuring that a large back focal length can be ensured, and the size of the entire optical system can be reduced. By defining a radius of curvature of the first face (on the side of the object) of the first lens 1 at the center thereof so as to satisfy the expression (2), a large back focal length can be ensured, and an increase in angle of view and a reduction in focal length can be provided.

In addition, in the present invention, the diaphragm 4 is disposed at the location closer to the object from the central point between the first and second lenses 1 and 2. Therefore, an increase in size of each lens 1, 2, 3, particularly, the third lens 3, can be prevented. Further, the disposition of the diaphragm 4 between the first and second lenses 1 and 2 ensures that an unnecessary light beam of an off-axial flux causing a flaring or the like can be corrected or removed effectively, as compared with a case where the diaphragm 4 is disposed at a location closer to an object from the first lens 1.

Further, in the present embodiment, the first face of the second lens 2 adjacent the object is formed into the aspherical face and may be a concave or convex surface. By forming the first face of the second lens 2 adjacent the object into the aspherical face, the correction of various aberrations can be achieved effectively by the second lens 2.

When the first face of the second lens 2 is the concave face, various aberrations including mainly an axial chromic aberration can be corrected satisfactorily, and an exit pupil can be located at a point far away of the image surface, while shortening the entire length of the optical system, thereby ensuring a high telecentric property. Further, the second lens 2 can be formed at a high eccentricity resistance and produced easily.

When the first face of the second lens 2 is the convex face, a further reduction in size of the entire optical system can be achieved, while ensuring a high telecentric property to a certain extent, as compared with the case where the first face is the concave face. This is because the effective diameter of the third lens 3 can be decreased by the forming the first face of the second lens 2 into the convex face, thereby proving a reduction in size of the entire optical system.

The focal length $F_1$ of the first lens 1 and the focal length f1 of the entire optical system satisfy the following condition:

$$f1 < f_1 \quad (3)$$

If such a relationship is established, it is possible to ensure a practically sufficient back focal length for an image pickup lens.

Therefore, in the present embodiment, by forming each of the lenses 1, 2 and 3 in the above-described manner, a sufficient back focal length can be ensured, while maintaining a desired optical performance, and a distance from the image surface to the exit pupil can be ensured to ensure a high telecentric property. Moreover, a reduction in size of the entire optical system can be achieved, and the entire optical system can be produced easily.

The optical system in the present embodiment is extremely suitable as a wide-angle optical system having a diagonal length of an image surface equal to or smaller than 10 mm.

EXAMPLES

Examples of the present invention will be described below with reference to FIGS. 2 to 11.

In the examples of the present invention, f1 represents a focal length of the entire optical system; $f_1$ represents a focal length of a first lens 1; $f_2$ represents a focal length of a second lens 2; $f_3$ represents a focal length of a third lens 3; F represents an F number; $2\square$ represents an angle of diagonal view; r represents a radius of curvature of each of the lens surfaces; d represents a lens thickness or an air gap; nd represents a refractive index; and vd represents an Abbe number.

If a Z-axis is taken in a direction of an optical axis; a height from the optical axis is represented by x; and a direction of travel of light is defined to be positive, the aspherical shape of the lens is represented by the following equation:

$$Z = \frac{\frac{x^2}{r}}{1 + \sqrt{1 - (k+1)\frac{x^2}{r^2}}} + ax^4 + bx^6 + cx^8$$

wherein each of k, a, b and c is an aspherical factor.

Example 1

Figure 2:
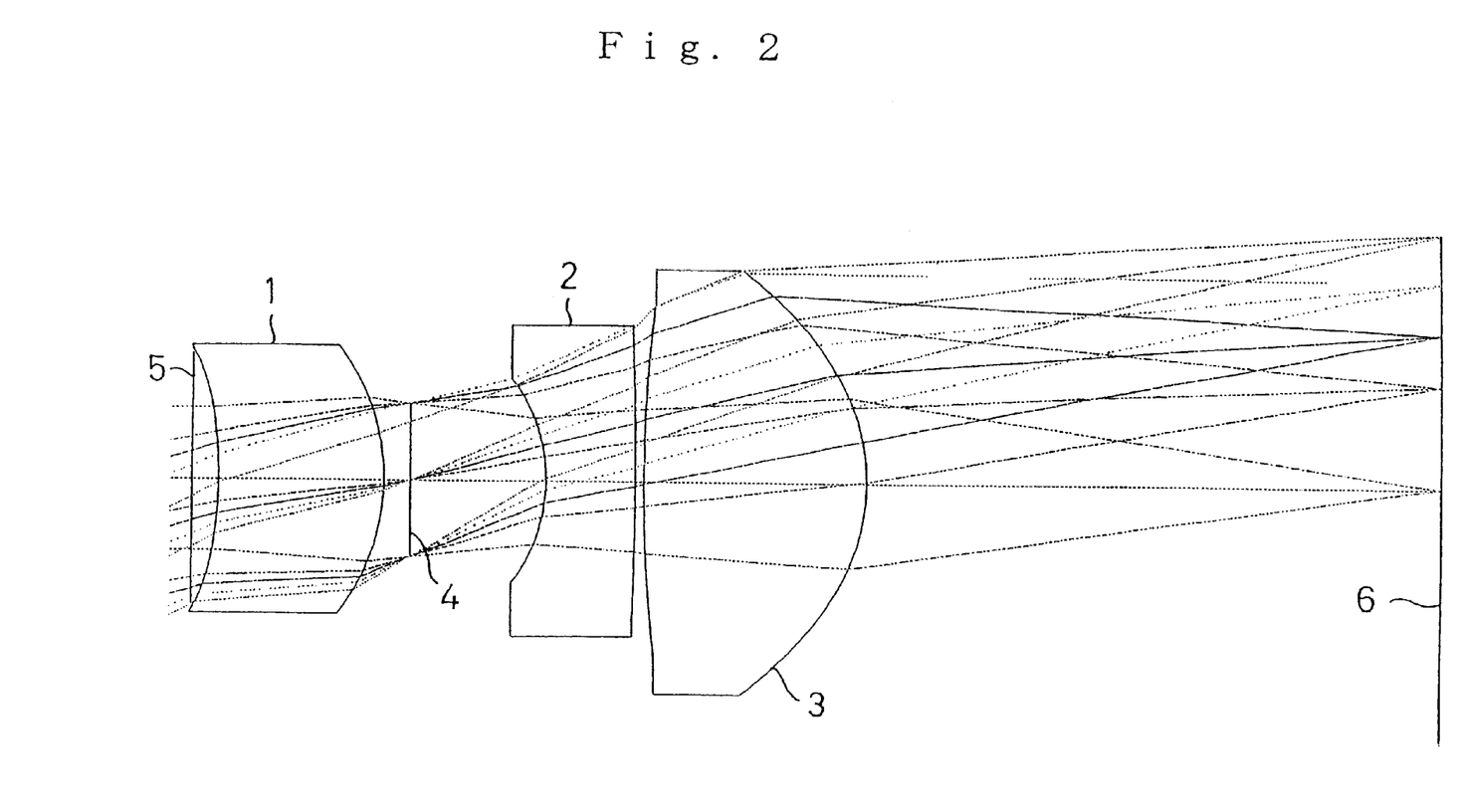
FIG. 2 is a schematic illustration showing Example 1 of an image pickup lens system according to the present invention.

FIG. 2 shows Example 1 of the present invention. This Example 1 is an image pickup lens system having an arrangement shown in FIG. 1. In Example 1, each of a first lens 1 and a third lens 3 is formed of a norbornene-based resin material, and a second lens 2 is formed of a fluorine-based resin material. The face of the second lens 2 on the side of an object is formed into a concave face. The image pickup lens system of the first Example is set under he following conditions:

f1=4.506 mm; F=3.50; $2\square$=54.6°; $f_1$=5.95 mm; $f_2$=−2.76 mm; and $f_3$=3.13 mm.

| Face | Radius r of curvature | Distance d | Refractive index nd | Abbe number vd |
|---|---|---|---|---|
| (1) Aperture plate | 0.000 | 0.2500 | | |
| (2) First face of first lens | −3.936 | 1.5000 | 1.52 | 56.0 |
| (3) Second face of first lens | −1.954 | 0.2300 | | |
| (4) Diaphragm | 0.000 | 1.2000 | | |
| (5) First face of second lens | −1.635 | 0.8000 | 1.62 | 24.0 |
| (6) Second face of second lens | −42.103 | 0.0800 | | |
| (7) First face of third lens | 13.973 | 2.0400 | 1.52 | 56.0 |
| (8) Second face of third lens | −1.742 | 5.1608 | | |
| (9) CCD face | | | | |

| | K | a | b | c |
|---|---|---|---|---|
| 2 | −1.796771e+001 | −5.398394e−002 | 9.428768e−003 | −.591703e−003 |
| 5 | −2.935990e+000 | −1.027686e−001 | −1.128442e−002 | 0.000000e+000 |
| 7 | 0.000000e+000 | 3.532775e−003 | −5.881568e−004 | 0.000000e+000 |
| 8 | −1.753994e+000 | −2.192258e−002 | 3.061948e−004 | 0.000000e+000 |

Under such conditions, f1/Bf=0.873 was established, whereby it is possible to ensure a back focal length enough to insert each of various filters or the like.

The radius $r_1$ of curvature of the face (first face) of the first lens adjacent the object was −3.936, and the focal length f1 of the entire optical system was 4.506, thereby satisfying the above expression (2).

Figure 3:
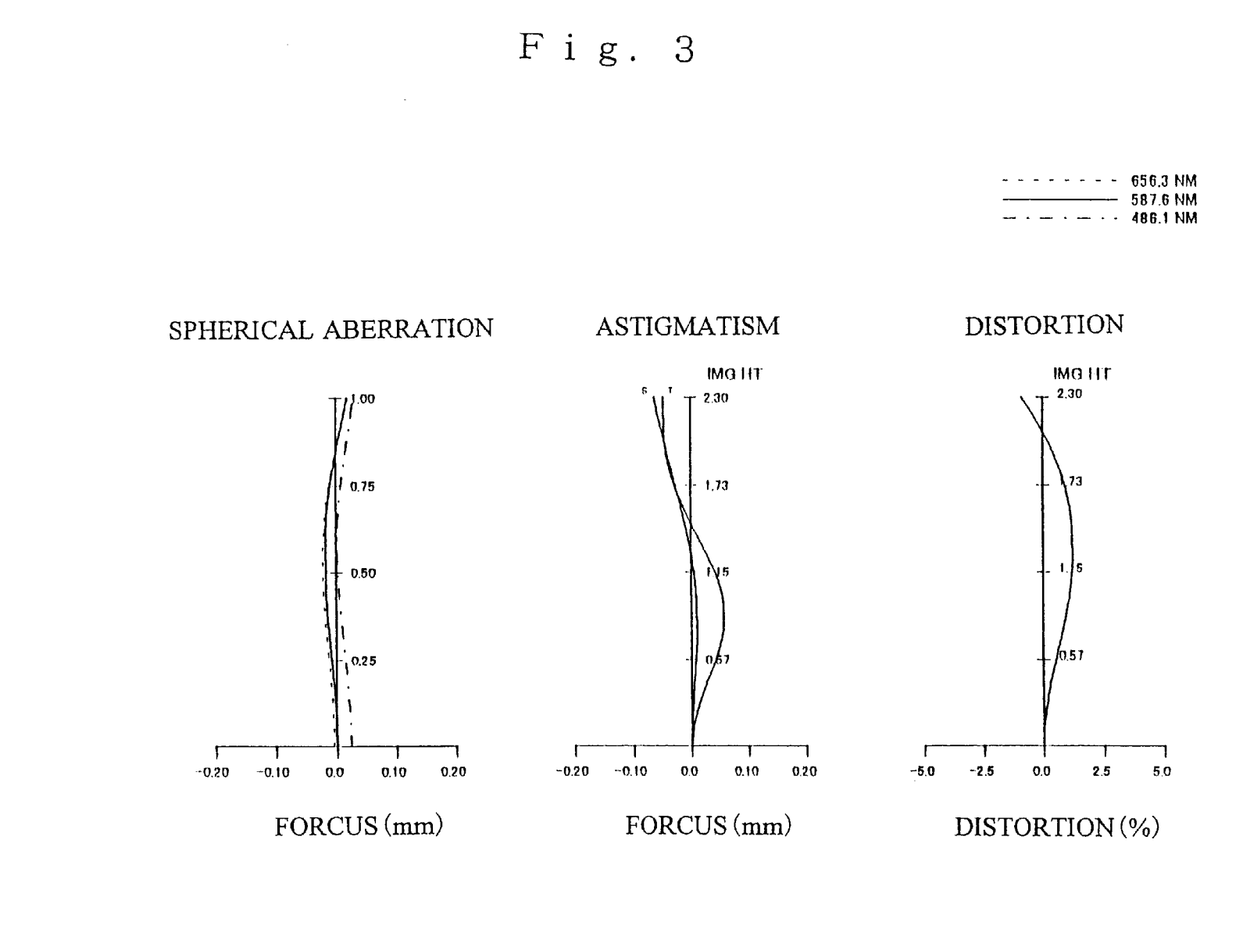
FIG. 3 is graphs showing the spherical aberration, the astigmatism and the distortion of the image pickup lens system shown in FIG. 2.

The spherical aberration, the astigmatism and the distortion in the image pickup lens system of this Example 1 are shown in FIG. 3.

As can be seen from the graphs in FIG. 3, all of the spherical aberration, the astigmatism and the distortion assume substantially satisfactory values, and hence, sufficient optical characteristics can b provided.

Example 2

Figure 4:
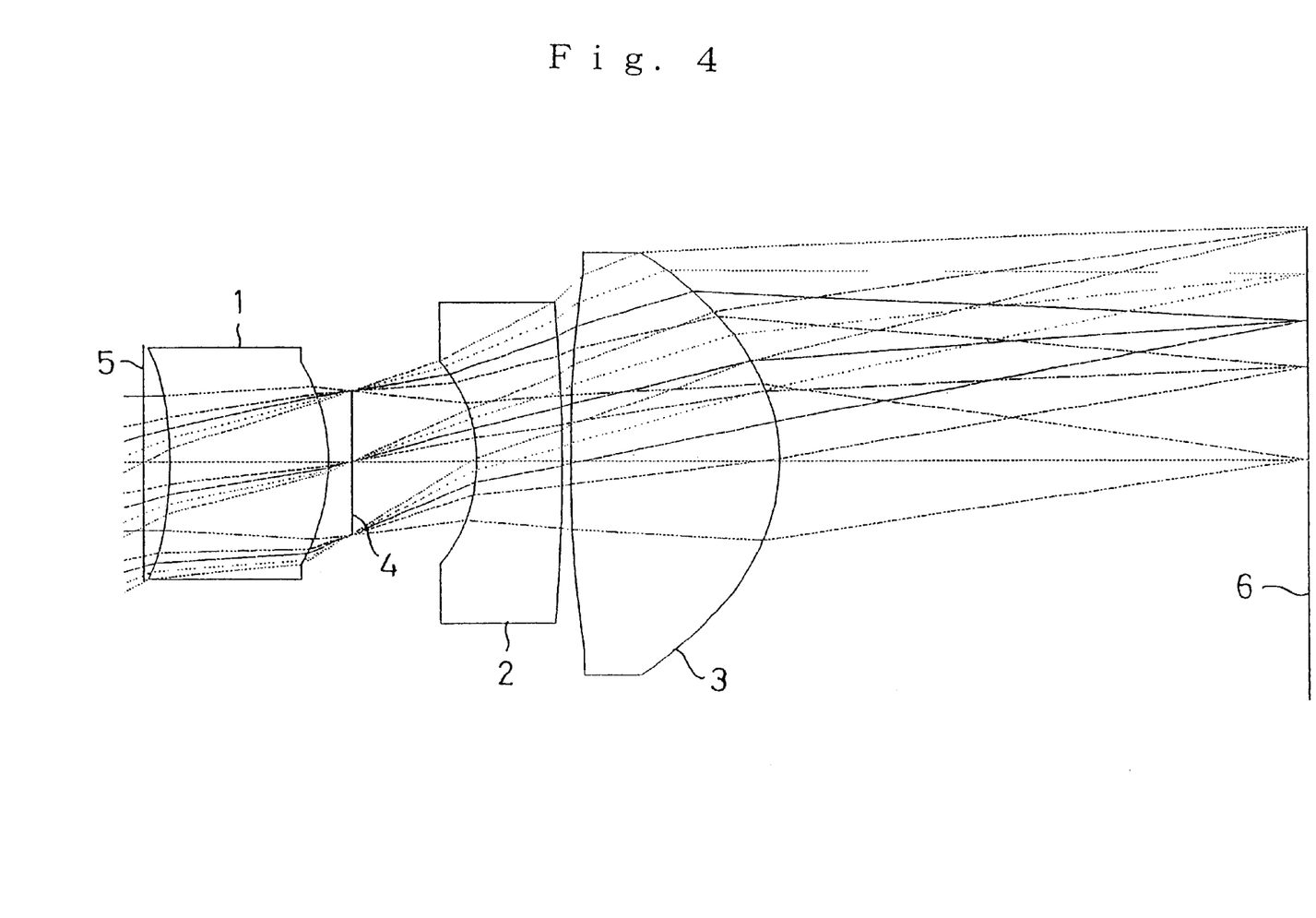
FIG. 4 is a schematic illustration showing an arrangement of Example 2 of an image pickup lens system according to the present invention.

FIG. 4 shows Example 2 of the present invention. This Example 2 is an image pickup lens system having the same arrangement as in FIG. 1, except that the first and second lenses were replaced by first and third lenses formed of PMMA which is a resin more inexpensive than that of the resin used in Example 1, and a face of a second lens 2 adjacent an object was formed into a concave face. The image pickup lens system of Example 2 is set under he following conditions:

f1=4.505 mm; F=3.50; $2\square$=53.3°; $f_1$=5.96 mm; $f_2$=−2.93 mm; and $f_3$=3.21 mm.

| Face | Radius r of curvature | Distance d | Refractive index nd | Abbe number vd |
|---|---|---|---|---|
| (1) Aperture plate | 0.000 | 0.2500 | | |
| (2) First face of first lens | −4.109 | 1.5000 | 1.49 | 58.0 |
| (3) Second face of first lens | −1.927 | 0.2300 | | |
| (4) Diaphragm | 0.000 | 1.2000 | | |
| (5) First face of second lens | −1.616 | 0.8000 | 1.62 | 24.0 |
| (6) Second face of second lens | −17.585 | 0.0800 | | |
| (7) First face of third lens | 15.151 | 2.0400 | 1.49 | 58.0 |
| (8) Second face of third lens | −1.686 | 5.0366 | | |
| (9) CCD face | | | | |

| | k | a | b | c |
|---|---|---|---|---|
| 2 | −1.488005e+001 | −4.713769e−002 | 4.657617e−003 | −7.279503e−003 |
| 5 | −3.060141e+000 | −1.089046e−001 | −8.247121e−003 | 0.000000e+000 |
| 7 | 0.000000e+000 | 4.334023e−003 | −7.377534e−004 | 0.000000e+000 |
| 8 | −1.511785e+000 | −1.830150e−002 | 1.897080e−006 | 0.000000e+000 |

Under such conditions, f1/Bf=0.894 was established, whereby it is possible to ensure a back focal length enough to insert each of various filters or the like.

The radius $r_1$ of curvature of the face (first face) of the first lens adjacent the object was −4.109, and the focal length f1 of the entire optical system was 4.505, thereby satisfying the above expression (2).

Figure 5:
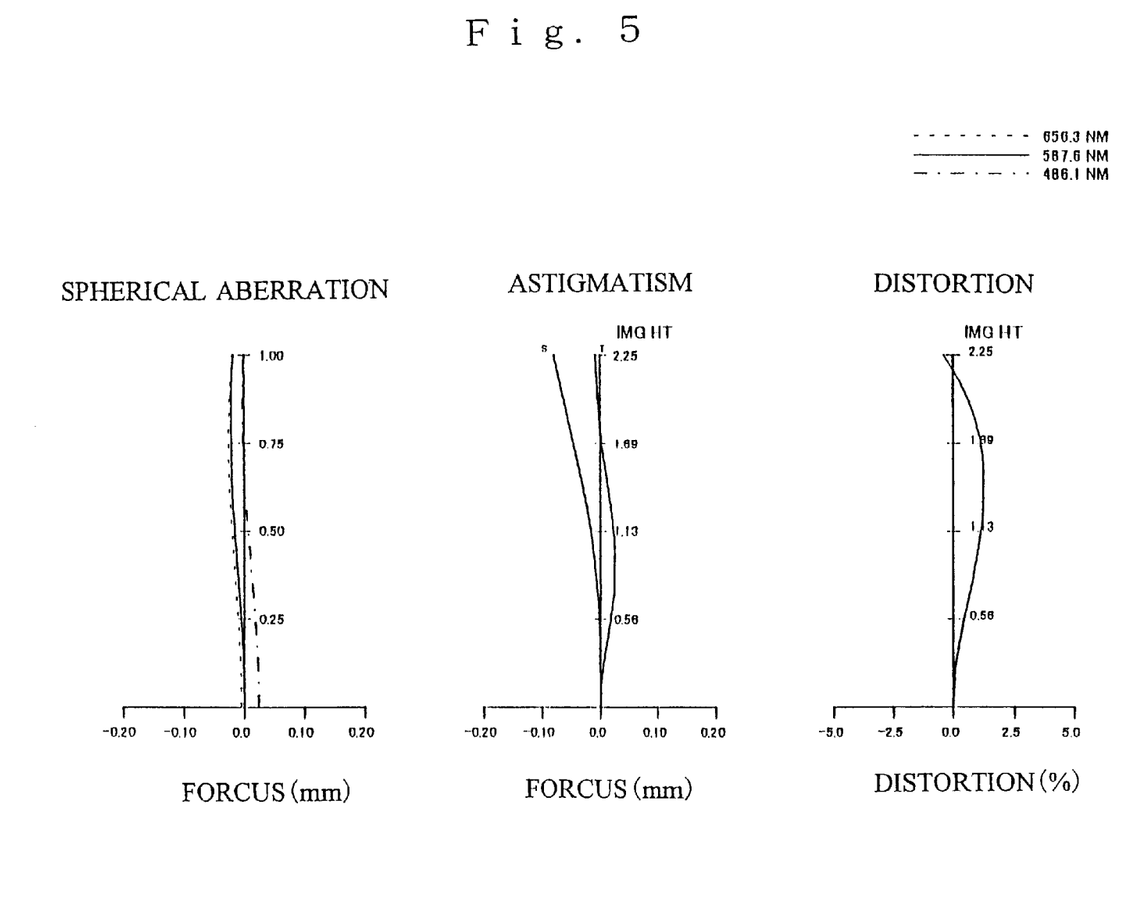
FIG. 5 is graphs showing the spherical aberration, the astigmatism and the distortion of the image pickup lens system shown in FIG. 4.

The spherical aberration, the astigmatism and the distortion in the image pickup lens system of this Example 1 are shown in FIG. 5.

As can be seen from the graphs in FIG. 5, all of the spherical aberration, the astigmatism and the distortion assume substantially satisfactory values, and hence, sufficient optical characteristics can b provided.

Example 3

Figure 6:
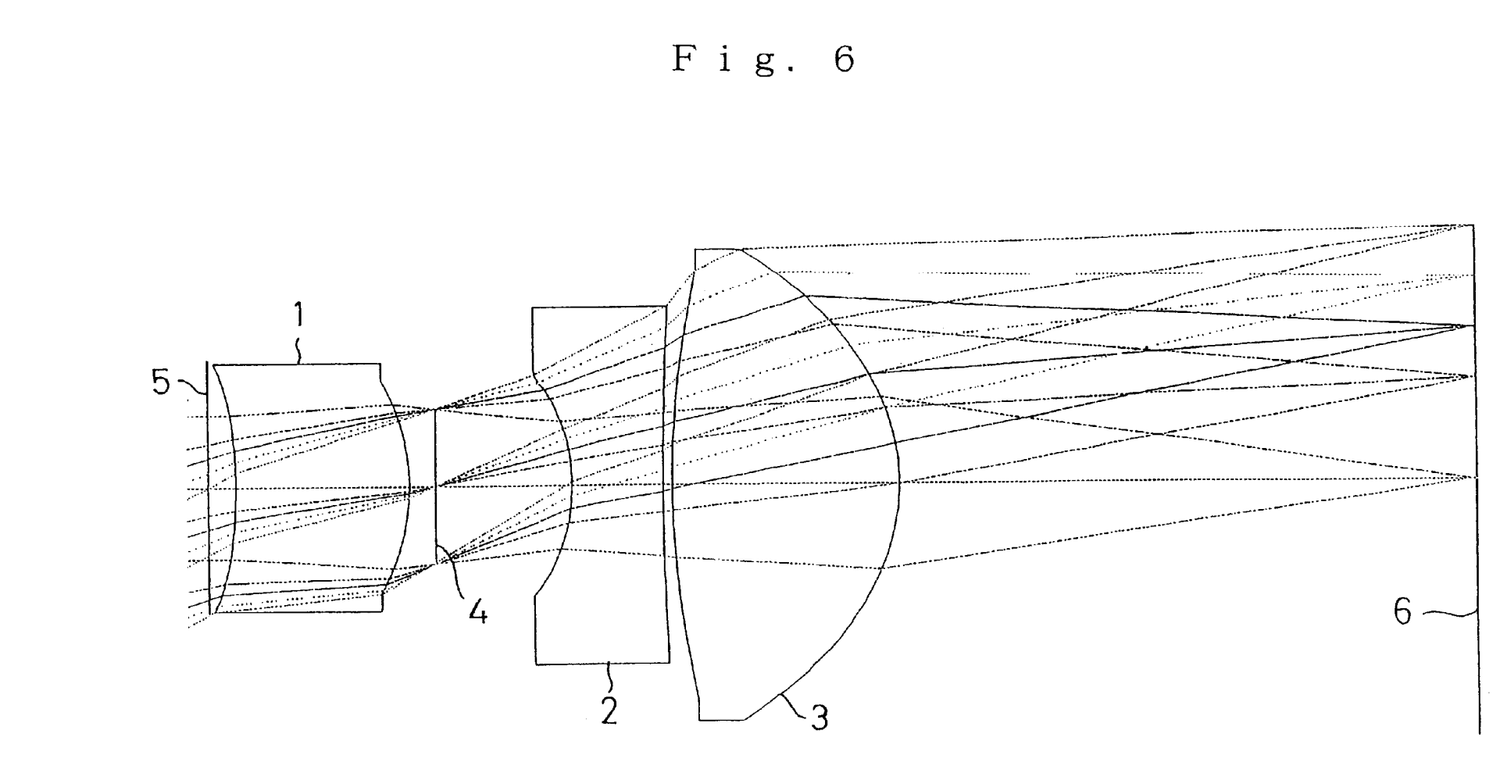
FIG. 6 is an illustration showing an arrangement of Example 3 of an image pickup lens system according to the present invention.

FIG. 6 shows Example 3 of the present invention. This Example 3 is an image pickup lens system having the same arrangement as in FIG. 1. In Example 3, first, second and third lenses 1, 2 and 3 were formed of the same materials as in Example 1, the face (first face) of the second lens 2 adjacent an object being formed into a concave face, and the face (second face) of the second lens adjacent an image surface being also formed into a concave face. The image pickup lens system of Example 3 is set under the following conditions:

$f1$=4.504 mm; $F$=3.50; 2□=53.9°; $f_1$=6.14 mm; $f_2$=−2.55 mm; and $f_3$=2.95 mm.

| Face | Radius r of curvature | Distance d | Refractive index nd | Abbe number vd |
|---|---|---|---|---|
| (1) Aperture plate | 0.000 | 0.2500 | | |
| (2) First face of first lens | −4.043 | 1.5000 | 1.52 | 56.0 |
| (3) Second face of first lens | −2.005 | 0.2300 | | |
| (4) Diaphragm | 0.000 | 1.2000 | | |
| (5) First face of second lens | −1.706 | 0.8000 | 1.62 | 24.0 |
| (6) Second face of second lens | 24.905 | 0.0800 | | |
| (7) First face of third lens | 7.066 | 2.0400 | 1.52 | 56.0 |
| (8) Second face of third lens | −1.761 | 5.1409 | | |
| (9) CCD face | | | | |

| | k | a | b | c |
|---|---|---|---|---|
| 2 | −1.126944e+001 | −3.986074e−002 | 2.486513e−003 | −5.354397e−003 |
| 5 | −3.825061e+000 | −1.080441e−001 | −8.036773e−004 | 0.000000e+000 |
| 7 | 0.000000e+000 | −2.910279e−003 | −6.485261e−005 | 0.000000e+000 |
| 8 | −1.082310e+000 | −7.364571e−003 | −1.041544e−003 | 0.000000e+000 |

Under such conditions, f1/Bf=0.876 was established, whereby it is possible to ensure a back focal length enough to insert each of various filters or like.

The radius $r_1$ of curvature of the face (first face) of the first lens adjacent the object was −4.043, and the focal length f1 of the entire optical system was 4.504, thereby satisfying the above expression (2).

Figure 7:
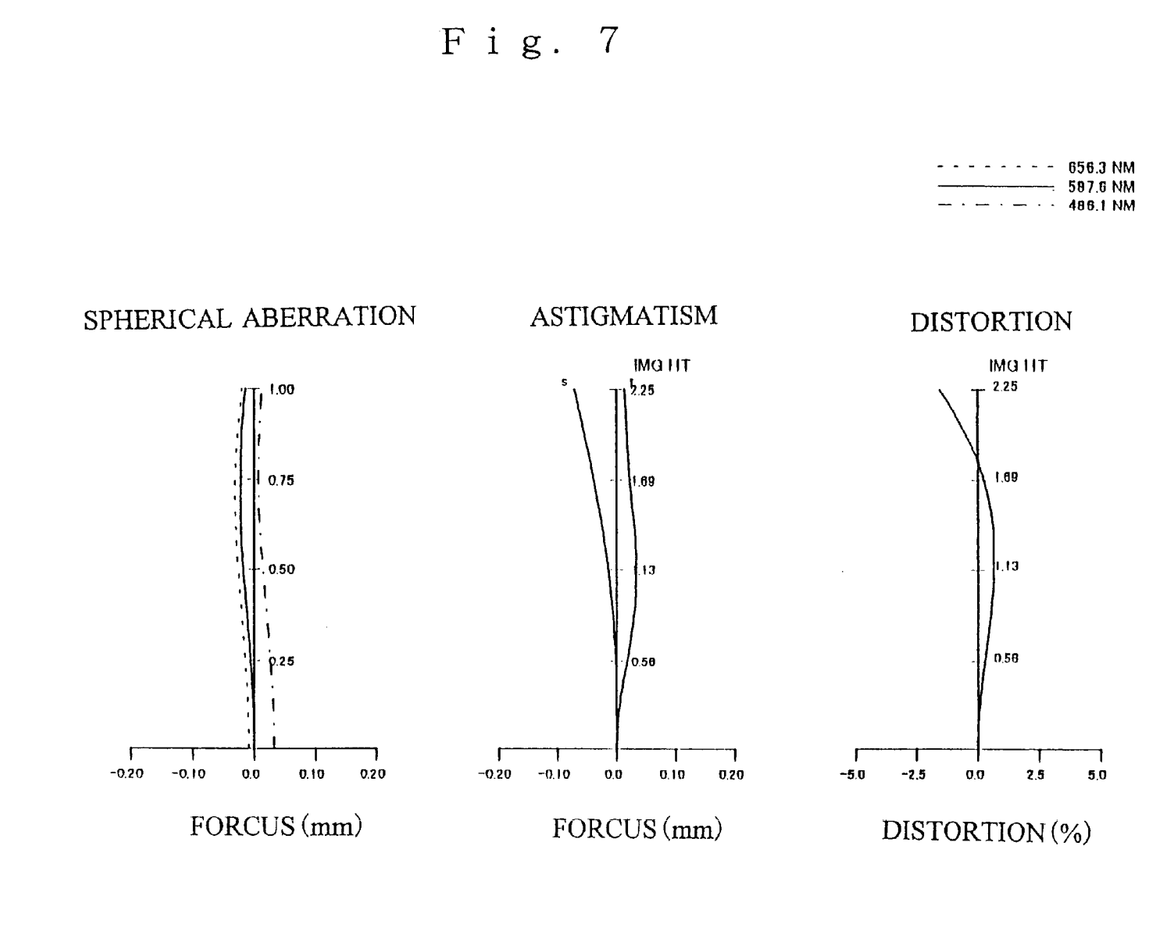
FIG. 7 is graphs showing the spherical aberration, the astigmatism and the distortion of the image pickup lens system shown in FIG. 6.

The spherical aberration, the astigmatism and the distortion in the image pickup lens system of this Example 3 are shown in FIG. 7.

As can be seen from the graphs in FIG. 7, all of the spherical aberration, the astigmatism and the distortion assume substantially satisfactory values, and hence, sufficient optical characteristics can be provided.

Example 4

Figure 8:
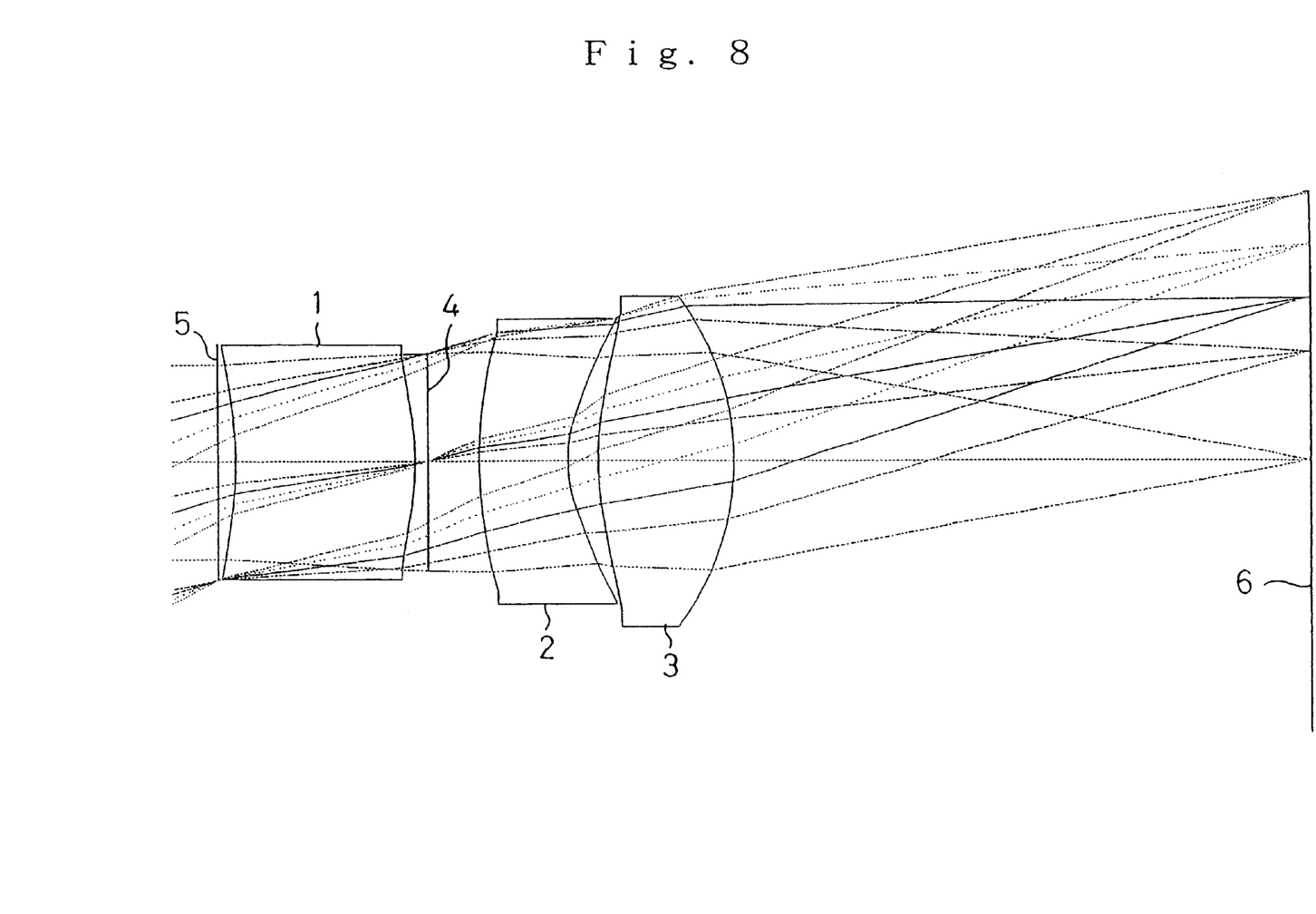
FIG. 8 is an illustration showing an arrangement of Example 4 of an image pickup lens system according to the present invention.

FIG. 8 shows Example 4 of the present invention. This example 4 is an image pickup lens system having the same arrangement as in FIG. 1 and including first, second and third lenses formed of the same material as in Example 1, Except that the face (first face) of the second lens adjacent an object was formed into a convex face. The image pickup lens system of Example 4 is set under the following conditions:

$f1=4.601$ mm; $F=2.80$; $2\square=54.9°$; $f_1=10.34$ mm; $f_2=-3.03$ mm; and $f_3=2.48$ mm.

| Face | Radius r of curvature | Distance d | Refractive index nd | Abbe number vd |
|---|---|---|---|---|
| (1) Aperture plate | 0.000 | 0.1500 | | |
| (2) First face of first lens | −3.300 | 1.5000 | 1.52 | 56.0 |
| (3) Second face of first lens | −2.358 | 0.1000 | | |
| (4) Diaphragm | 0.000 | 0.4250 | | |
| (5) First face of second lens | 3.798 | 0.7500 | 1.62 | 24.0 |
| (6) Second face of second lens | 1.162 | 0.2500 | | |
| (7) First face of third lens | 2.456 | 1.1500 | 1.52 | 56.0 |
| (8) Second face of third lens | −2.254 | 4.8588 | | |
| (9) CCD face | | | | |

| | k | a | b | c |
|---|---|---|---|---|
| 2 | −3.997346e+000 | 5.679938e−002 | −4.655795e−003 | 4.817045e−003 |
| 3 | −7.136375e+000 | 5.261960e−002 | −0.0000004+000 | 0.000000e+000 |
| 5 | −1.998324e+000 | 0.000000e+000 | 0.000000e+000 | 0.000000e+000 |
| 6 | −4.037446e+000 | 0.000000e+000 | 0.000000e+000 | 0.000000e+000 |
| 7 | −1.165261e+001 | −1.692344e−002 | 7.483576e−003 | −1.174312e−003 |
| 8 | −2.900114e−001 | −3.126908e−003 | −4.650835e−004 | 3.698844e−004 |

Under such conditions, f1/Bf=0.947 was established, whereby it is possible to ensure a back focal length enough to insert each of various filters or the like.

The radius $r_1$ of curvature of the face (first face) of the first lens adjacent the object was −3.300, and the focal length f1 of the entire optical system was 4.601, thereby satisfying the above expression (2).

Figure 9:
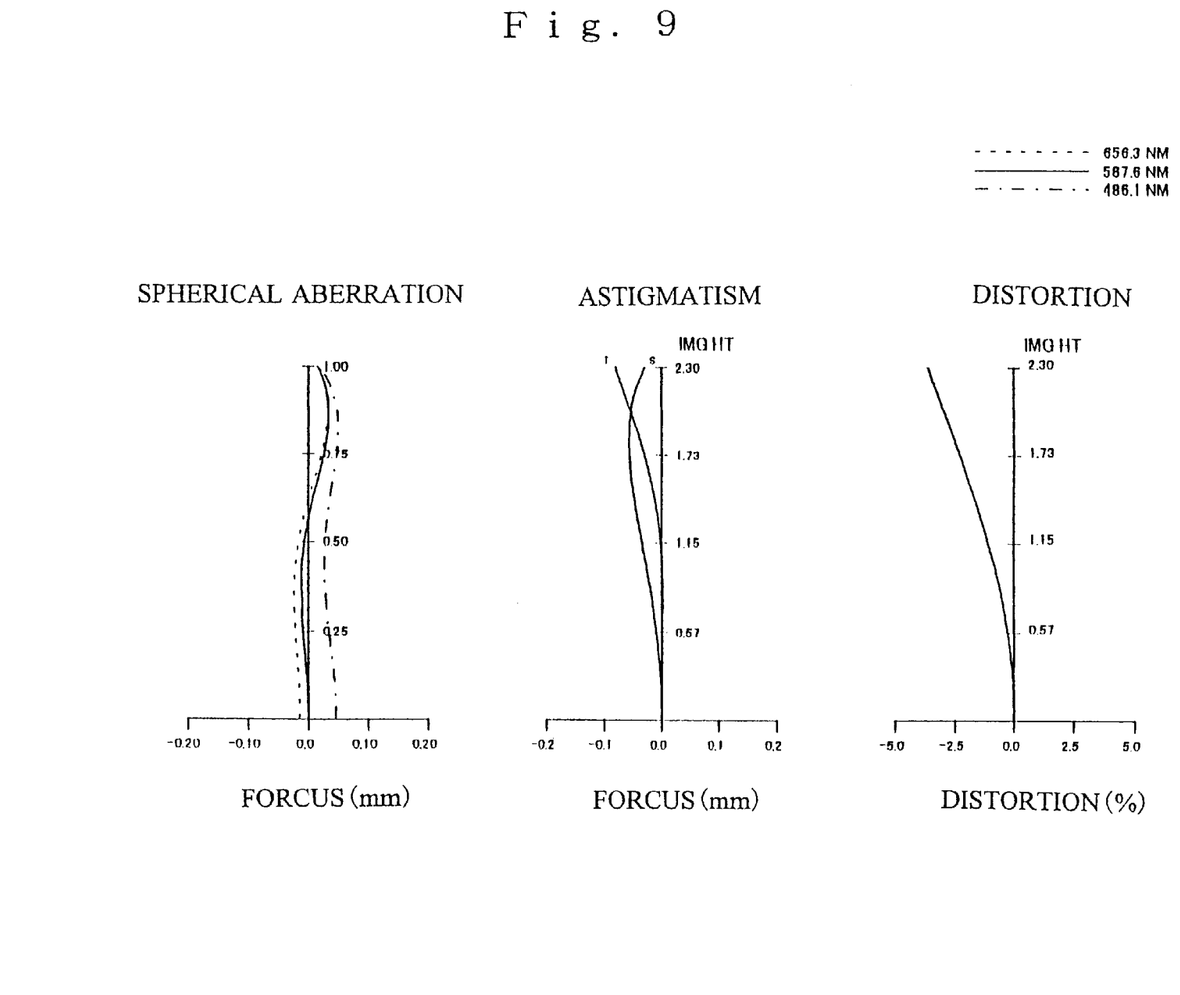
FIG. 9 is graphs showing the spherical aberration, the astigmatism and the distortion of the image pickup lens system shown in FIG. 8.

The spherical aberration, the astigmatism and the distortion in the image pickup lens system of this Example 4 are shown in FIG. 9.

As can be seen from the graphs in FIG. 9, all of the spherical aberration, the astigmatism and the distortion assume substantially satisfactory values, and hence, sufficient optical characteristics can be provided.

Example 5

Figure 10:
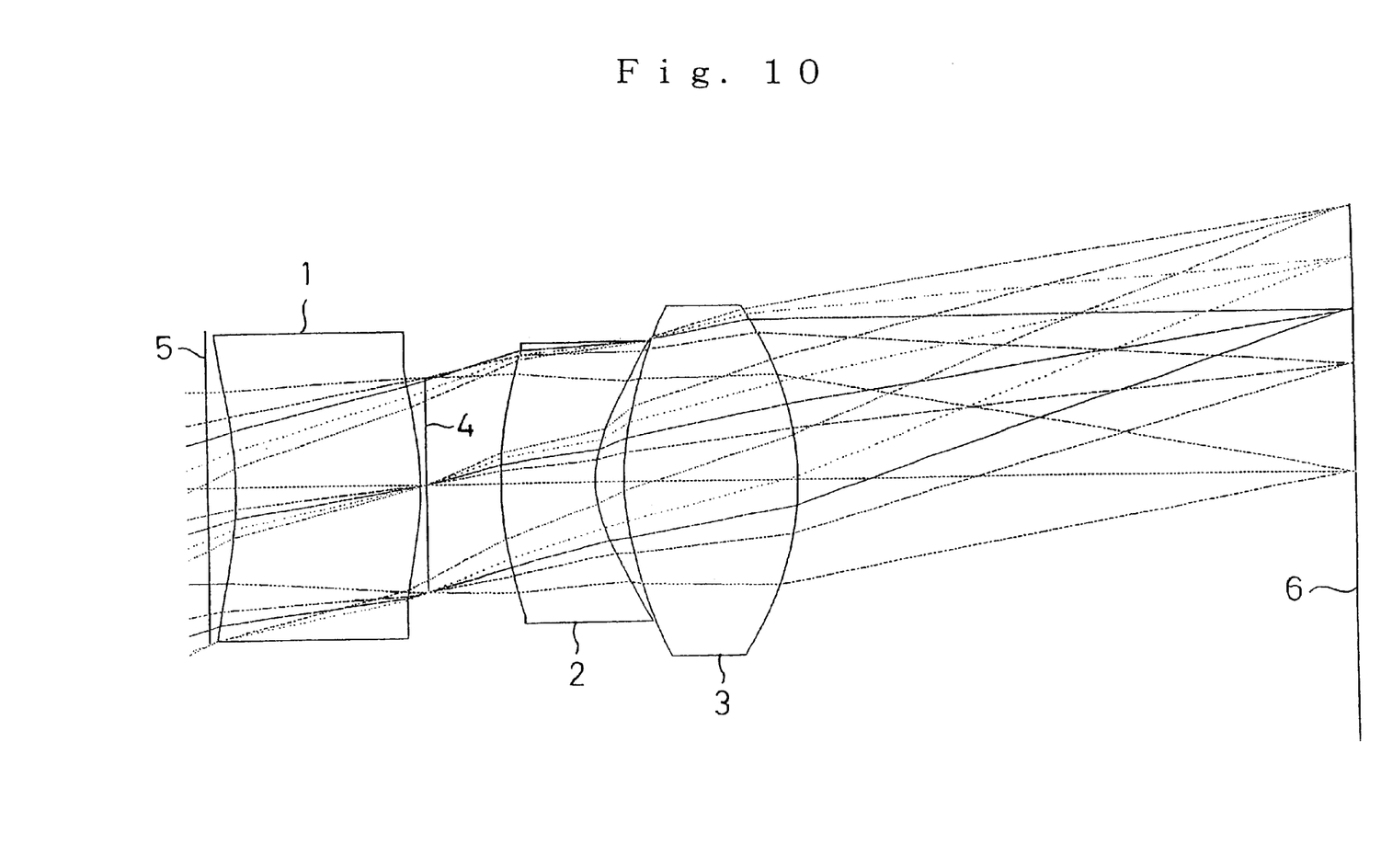
FIG. 10 is an illustration showing an arrangement of Example 5 of an image pickup lens system according to the present invention.

FIG. 10 shows Example 5 of the present invention. This example 5 is an image pickup lens system having the same arrangement as in FIG. 1. In Example 5, the face (first face) of a second lens 2 was formed into a convex face as in Example 4 from a polycarbonate used in place of the fluorine-based resin material. The image pickup lens system of Example 5 is set under the following conditions:

$f1=4.613$ mm; $F=2.80$; $2\square=53.4°$; $f_1=12.10$ mm; $f_2=-2.85$ mm; and $f_3=2.36$ mm.

| Face | Radius r of curvature | Distance d | Refractive index nd | Abbe number vd |
|---|---|---|---|---|
| (1) Aperture plate | 0.000 | 0.2500 | | |
| (2) First face of first lens | −3.035 | 1.5800 | 1.52 | 56.0 |
| (3) Second face of first lens | −2.407 | 0.0500 | | |
| (4) Diaphragm | 0.000 | 0.6400 | | |
| (5) First face of second lens | 3.063 | 0.8100 | 1.59 | 30.0 |
| (6) Second face of second lens | 0.974 | 0.2400 | | |
| (7) First face of third lens | 1.963 | 1.5300 | 1.52 | 56.0 |
| (8) Second face of third lens | −2.378 | 4.8391 | | |
| (9) CCD face | | | | |

| | k | a | b | c |
|---|---|---|---|---|
| 2 | 1.260039e+000 | 5.567776e−002 | −4.946849e−003 | 2.815582e−004 |
| 3 | −6.682073e+000 | 4.630250e−002 | 0.0000000+000 | 0.000000e+000 |
| 5 | −4.523719e+000 | 0.000000e+000 | 0.000000e+000 | 0.000000e+000 |
| 6 | −3.153085e+000 | 0.000000e+000 | 0.000000e+000 | 0.000000e+000 |
| 7 | −6.580016e+000 | −2.089169e−002 | 1.778772e−002 | −3.035464e−003 |
| 8 | −4.298040e−001 | 7.491390e−004 | −9.743472e−004 | 1.367406e−003 |

Under such conditions, f1/Bf=0.953 was established, whereby it is possible to ensure a back focal length enough to insert each of various filters or the like.

The radius $r_1$ of curvature of the face, (first face) of the first lens adjacent the object was −3.035, and the focal length f1 of the entire optical system was 4.613, thereby satisfying the above expression (2).

Figure 11:
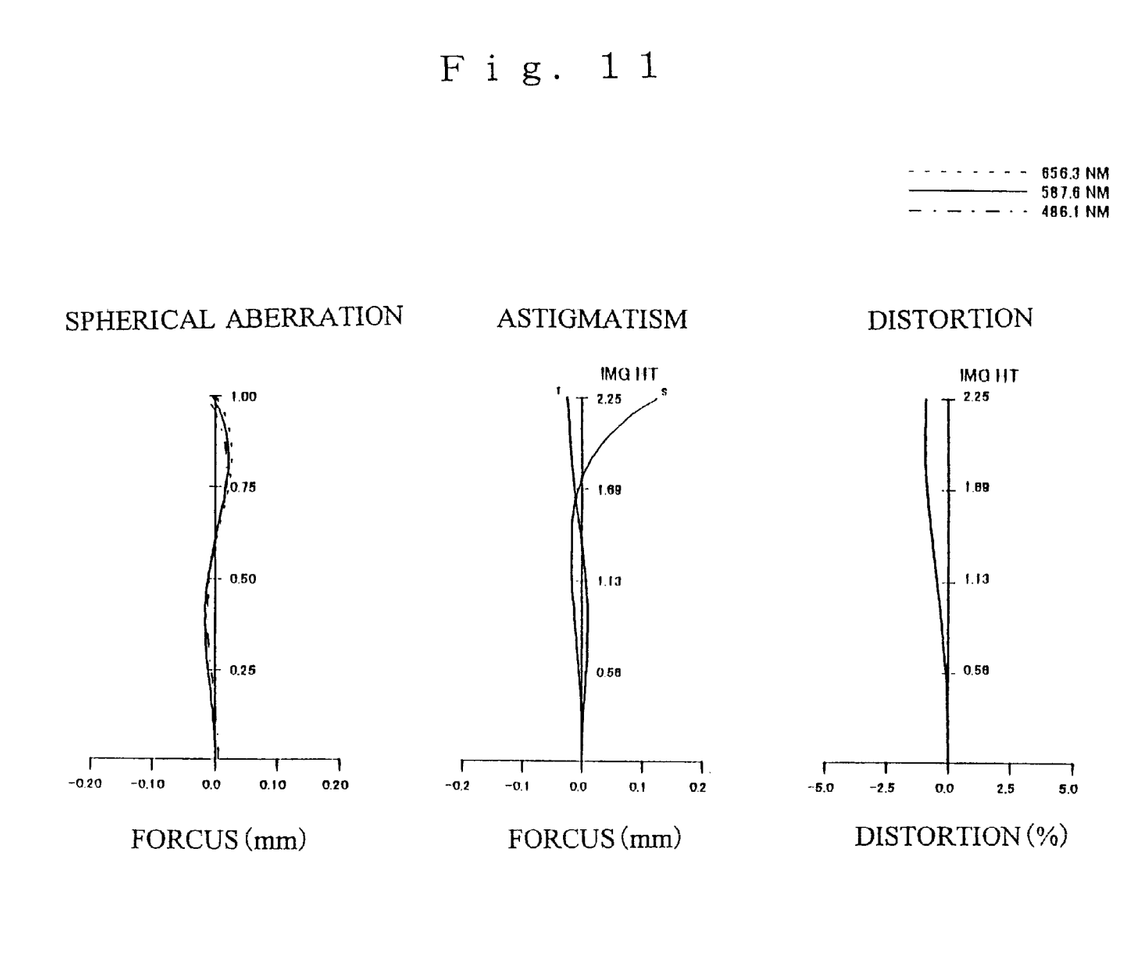
FIG. 11 is graphs showing the spherical aberration, the astigmatism and the distortion of the image pickup lens system shown in FIG. 10.

The spherical aberration, the astigmatism and the distortion in the image pickup lens system of this Example 5 are shown in FIG. 11.

As can be seen from the graphs in FIG. 9, all of the spherical aberration, the astigmatism and the distortion assume substantially satisfactory values, and hence, sufficient optical characteristics can be provided.

The embodiment of the present invention has been described in detail, it will be understood that the present invention is not limited to the above-described embodiment, and various embodiments may be made without departing from the spirit and scope of the invention defined in claims.

What is claimed is:

1. An image pickup lens system, comprising a first lens which has a concave face formed on the side of an object in the vicinity of an optical axis, and which has a positive power, a diaphragm, a second lens having a negative power, and a third lens having a positive power, said first lens, said diaphragm and said second and third lenses being arranged sequentially from the side of the object, and wherein said first lens satisfies the following condition:

$|r_1| \leq f1$ wherein $r_1$ is a radius of curvature of the face of said first lens adjacent the object at its center, and f1 is a local length of the entire optical system.

2. An image pickup lens system according to claim 1, wherein said diaphragm is disposed at a location closer to said first lens from an intermediate point between said first and second lenses.

3. An image pickup lens system according to claim 1, wherein the most object side face of at least said second lens is formed into an aspherical shape.

4. An image pickup lens system comprising a first lens which has a concave face formed on the side of an object in the vicinity of an optical axis, and which has a positive power, a diaphragm, a second lens having a negative power, and a third lens having a positive power, said first lens, said diaphragm and said second and third lenses being arranged sequentially from the side of the object, said first lens satisfying the following condition:

$|r_1| \leq f1$ wherein $r_1$ is a radius of curvature of the face of said first lens adjacent the object at its center, and f1 is a focal length of the entire optical system, said diaphragm being disposed at a location closer to said first lens from an intermediate point between said fist and second lenses, the most object side face of at least said second lens being formed into an aspherical shape.

* * * * *